United States Patent [19]

Bibollet

[11] 4,333,212

[45] Jun. 8, 1982

[54] SNAP-HOOK, PARTICULARLY FOR MOUNTAINEERING

[76] Inventor: Jean-Claude Bibollet, F-Glapigny-74230-Thones, France

[21] Appl. No.: 94,858

[22] Filed: Nov. 16, 1979

[30] Foreign Application Priority Data

Nov. 17, 1978 [FR] France ............................. 78 33354

[51] Int. Cl.³ ............................................ A44B 13/02
[52] U.S. Cl. .......................................... 24/233; 24/234
[58] Field of Search ................... 24/73 HH, 233, 231, 24/232 R, 232 G, 234, 235, 241 S, 241 SP; 59/89, 88

[56] References Cited

U.S. PATENT DOCUMENTS

| 606,997 | 7/1898 | Mehl | 24/235 |
| 2,876,520 | 3/1959 | Sporkland | 24/73 HH |
| 4,095,316 | 6/1978 | Gabriel | 24/234 |

FOREIGN PATENT DOCUMENTS

| 966655 | 10/1950 | France | 24/233 |
| 1518783 | 3/1968 | France | 24/232 |
| 177993 | 6/1935 | Switzerland | 24/234 |

Primary Examiner—Alexander Grosz
Attorney, Agent, or Firm—Larson and Taylor

[57] ABSTRACT

A snap-hook is provided which consists of an open ring and of a tilting finger whose one end pivots upon the corresponding end of the body of the ring and is drawn back by means of a spring. The axis around which the said finger tilts is inclined with respect to the perpendicular to the plane of the ring, so that, when the snap-hook opens, the finger tilts out of this plane and may to pass beyond the opposite main longitudinal back arm of the ring, without striking against it.

1 Claim, 6 Drawing Figures

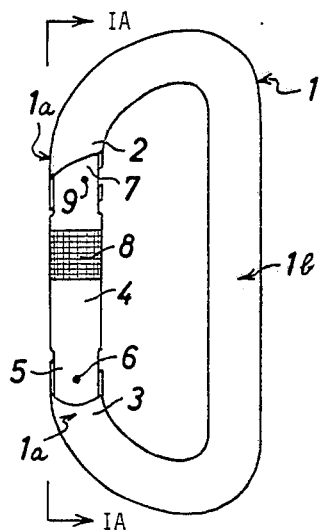
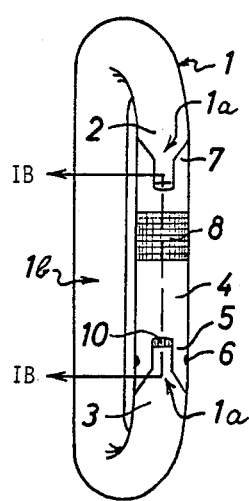
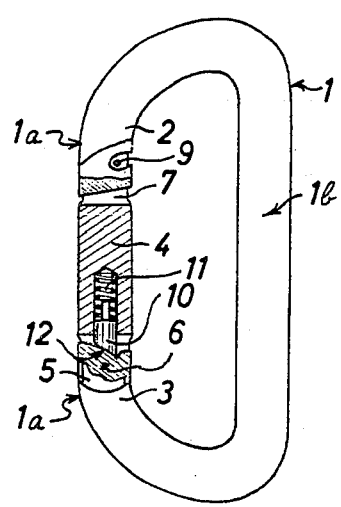
FIG.1     FIG.1A     FIG.1B
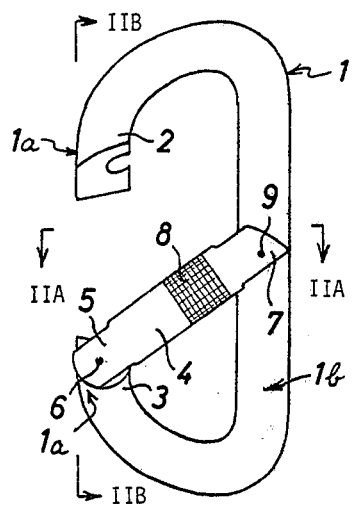
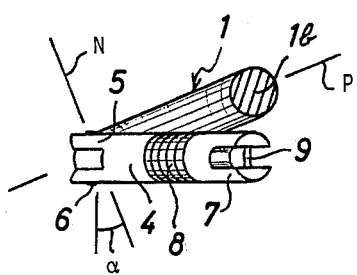
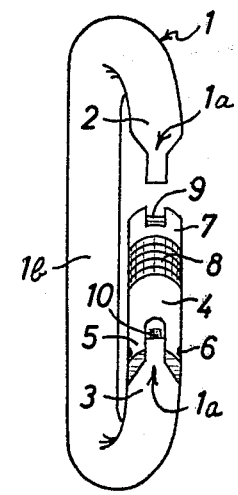
FIG.2     FIG.2A     FIG.2B

SNAP-HOOK, PARTICULARLY FOR MOUNTAINEERING

FIELD OF THE INVENTION

The present invention relates to a snap-hook, particularly for mountaineering, but more generally for those sports which necessitate use of ropes, especially mountaineering, spelaeology and aquatic sports.

BACKGROUND OF THE INVENTION

The prior art snap-hooks are ring-shaped and usually made from a metallic tube or rod with a circular section which is bent usually in a non circular plane to form an almost closed ring. They are provided with a closing finger which pivots at one of its ends upon the another end of the ring and turns into the plane of this ring. When the snap-hook is shut, this finger joins the ends of the ring according to a continuous closed loop which retains the inserted rope. These snap-hooks may be provided with a single or a double lock device usually mounted upon this finger and which co-operate with the body of the ring and prevents the opening of the snap-hook without the assent of the user. Such snap-hooks have a high tensile strength along their length and a less tensile strength along their width. The above mentioned lock device avoids untimely openings of the snap-hook and moreover increases its tensile strength along its width when this is a single lock device—with only one collar which slides along the finger—and still more if this is a double lock device—with two collars which slide along the finger.

All the snap-hooks of the prior art have a tilting finger which pivots into the plane of the ring and around an axis which is perpendicular to this plane of the ring. When the snap-hook is shut, the ends of the finger are in contact with the ends of the ring. When the snap-hook is open, the finger is inclined into the plane of the ring, within the inner area of the snap-hook and then the free end of the finger strikes against the opposite main longitudinal back arm of the ring, which limits the maximum tilting of the finger and the opening of the snap-hook. For achieving the adequate opening of the snap-hook which allows insertion of ropes or the like, such snap-hooks of the prior art have to be over-sized. As a result, their weight and their cost are increased more than desirable.

SUMMARY OF THE INVENTION

It is an object of the invention to provide a snap-hook which avoids this disadvantage and whose finger may be inclined much more than the one of a conventional snap-hook, without oversizing. Therefore, the snap-hook of the invention is lighter and cheaper than the above mentioned conventional snap-hooks. It consists of an open ring made from a cylindrical rod and of a tilting finger, one of whose ends pivots upon the other end of the ring when the snap-hook opens, and which is drawn back by means of a spring or the like in order to join the ends of the ring and to shut the snap-hook.

According to the main feature of the invention, the axis around which the finger pivots is inclined with respect to the perpendicular to the plane of the ring, so that, when the snap-hook opens, the finger tilts out of this plane and pass beyond the opposite main longitudinal back arm of the ring, without striking against it.

According to the preferred embodiment of the invention, the axis around which the finger pivots is inclined with respect to the perpendicular to the plane of the ring by only a few degrees, so that, when the snap-hook opens, the free end of the finger, which then passes beyond the opposite arm of the ring, is approximately tangent to the said arm.

Thus, the mobility of the finger into a plane other than the plane of the ring permits to obtain, in comparison with the conventional snap-hooks, either (for the same size of the snap-hook) an increased opening of the snap-hook and a better insertion of ropes, or (for the same opening of the snap-hook) a reduction in the size and the weight of the snap-hook.

Other features, additional objects, and many of the attendant advantages of this invention will readily be appreciated as the same becomes better understood from the following detailed description of a preferred embodiment when considered in connection with the appended drawing.

BRIEF DESCRIPTION OF THE DRAWINGS

FIG. 1 shows a snap-hook of the invention in its shut position;

FIG. 1A is a lateral perspective view taken along line IA—IA of FIG. 1;

FIG. 1B shows the snap-hook of FIG. 1 with parts broken away to show their internal structure;

FIG. 2 shows a snap-hook of the invention in its open position;

FIG. 2A is a section taken along line IIA—IIA of FIG. 2; and

FIG. 2B is a lateral perspective view taken along line IIB—IIB of FIG. 2.

DESCRIPTION OF THE PREFERRED EMBODIMENTS

Referring initially to FIG. 1, the snap-hook of the invention consists of a rod (or tube) with a circular or quasicircular cross-section, which is bent to a non-circular ring 1 whose the length is higher than the width. One—1a—of its two longitudinal arms 1a and 1b comprises an opening bounded by the opposite ends 2 and 3 of the body of the ring 1. This snap-hook is provided with a moving finger 4 which tilts, by its end 5, upon the end 3 of the body of the ring 1, around an axis 6. The other and free end 7 of this finger 4 is shaped so that it may be engaged into the end 2 of the ring 1 and closes the ring 1 in continuously joining those two ends 2 and 3. The moving finger 4 is drawn back in a conventional manner by means of a spring 11 or the like when the snap-hook shuts. Spring 11 pushes a pin 10 upon a special pattern 12 of the end 3 of the bottom part of arm 1a. A rod 9 in the upper end 7 of the finger 4 engages into a slot of upper end 2 of the arm 1a when the snap-hook is shut.

Referring now more particularly to FIGS. 2 and 2a, which show the snap-hook in its open position, and according to the main feature of the invention, the axis 6 around which the finger 4 tilts, is not, as it is in the conventional aforesaid snap-hooks, perpendicular to the plane "P" of the ring but, on the contrary, is inclined by an angle "α" with respect to the perpendicular "N" to the said plane "P" of the ring 1 (FIG. 2a), so that, when the snap-hook opens, the finger 4 tilts out of this plane "P" of the ring 1 and into the plane of FIGS. 1, 1B and 2 as shown in the drawing.

According to the preferred embodiment of the invention, the axis 6 is orthogonal to the axis of the longitudinal arm 1b of the snap-hook, which is opposed to the finger 4, and the angle "α" is only of a few degrees. So that, at the opening of the snap-hook (FIG. 2), the finger 4 may to pass beyond this opposite arm 1b without striking against it, and its free end 7 is then approximately tangent to the said opposite arm 1b. However, that axis 6 may be, in other embodiments of the invention, neither perpendicular to the said plane "P" of the ring 1, nor orthogonal to the axis of the opposite longitudinal arm 1b.

It should be understood, of course, that the foregoing disclosure relates only to a preferred embodiment of the invention, and that it is intended to cover all changes and modifications of the examples of the invention herein chosen for the purpose of the disclosure which do not constitute departures from the spirit and scope of the invention set forth in the appended claims.

I claim:

1. A snap-hook for use with ropes or the like comprising an open ring made from a cylindrical rod and a tilting finger, said open ring comprising a main longitudinal back arm and two curved end portions, said tilting finger being pivotably attached at one end of said open ring so as to pivot thereon and join the other end of the ring so as to shut the snap-hook, the axis around which the finger pivots being inclined with respect to the line perpendicular to the plane of the ring by only a few degrees, so that when the snap-hook opens, the free end of the finger tilts out of this plane and passes along side of and very close to the main longitudinal back arm of the ring, almost touching it when in fully opened position, thereby increasing the opening of the snap-hook and facilitating insertion therein of ropes or the like, and spring means for returning the finger to the plane of the ring and shutting the snap-hook.

* * * * *